(No Model.)  2 Sheets—Sheet 1.

J. F. & R. T. GENT.
PROCESS OF DEGERMINATING CEREALS.

No. 581,908. Patented May 4, 1897.

WITNESSES:
William P. Goebel.
George Cook.

INVENTORS
Joseph F. Gent and
Richard T. Gent
BY
Rowland Cox
ATTORNEY.

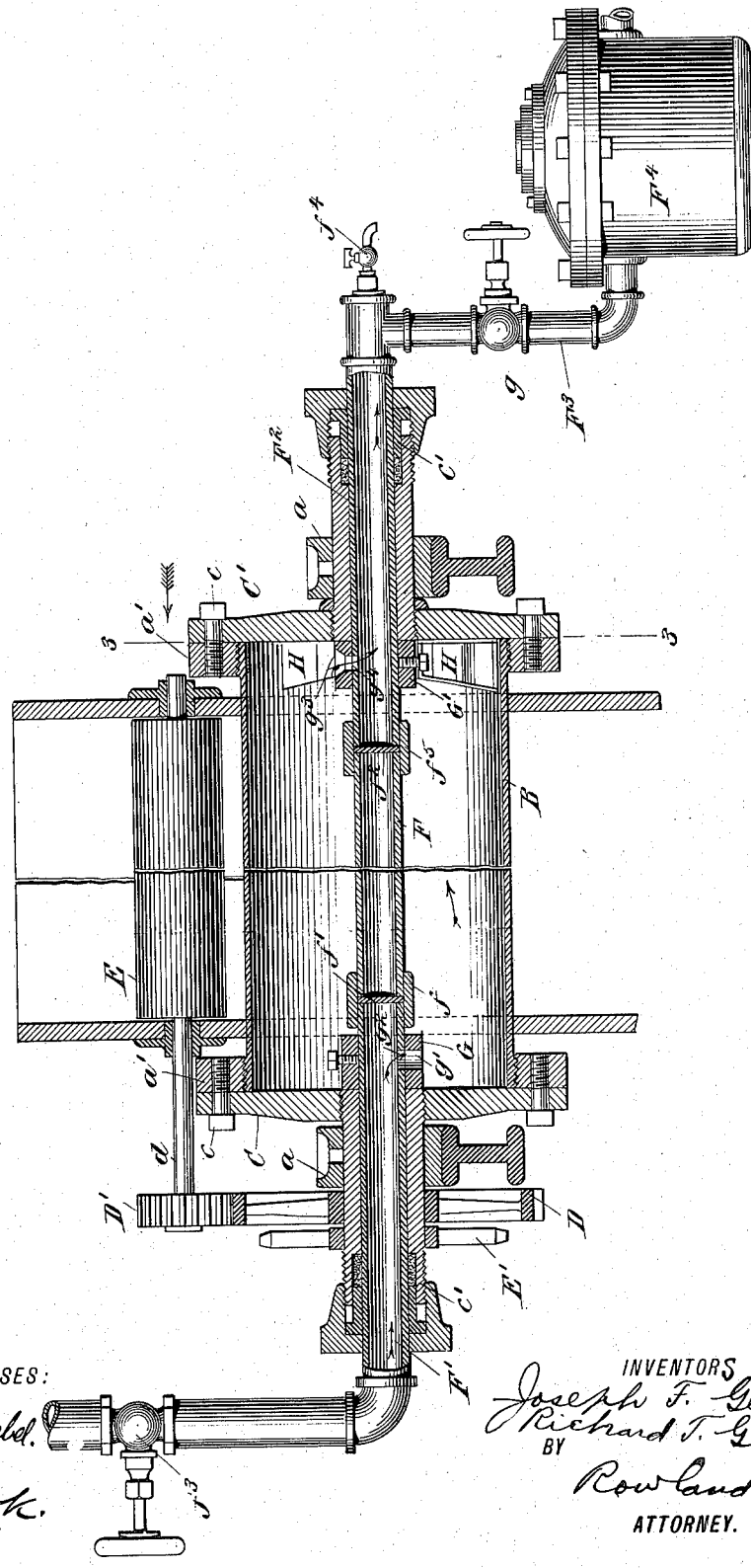

UNITED STATES PATENT OFFICE.

JOSEPH FRANKLIN GENT AND RICHARD THOMAS GENT, OF INDIANAPOLIS, INDIANA.

PROCESS OF DEGERMINATING CEREALS.

SPECIFICATION forming part of Letters Patent No. 581,908, dated May 4, 1897.

Application filed August 21, 1896. Serial No. 603,464. (No specimens.)

*To all whom it may concern:*

Be it known that we, JOSEPH FRANKLIN GENT and RICHARD THOMAS GENT, citizens of the United States, and residents of Indianapolis, in the county of Marion and State of Indiana, have invented a certain new and useful Improved Process of Degerminating Cereals, of which the following is a specification.

Our invention relates to an improved method of separating the germs from the hard, starchy, and glutinous portions of ground cereals, the object being to devise a method whereby the above result may be accomplished more readily and economically and with more certainty than has heretofore been possible.

With these and other ends in view our invention consists, briefly, of crushing or grinding the grain, such, for instance, as corn; secondly, separating the husks and foreign matter therefrom by a series of winnowings or screenings or otherwise, and, finally, subjecting the material to a heated revolving roll or cylinder for separating the germs or oily portions from the starchy and glutinous portions.

Our improved method further consists in certain novel features and details hereinafter fully described, and specifically pointed out in the claims.

In the accompanying drawings we have shown one form or construction of machine for carrying out our improved method, but we would have it clearly understood that we in no wise limit our invention to the structure shown, as it will be evident to those skilled in the art that other machines may be devised which radically differ from the one shown and which in practice would be capable of carrying out our improved method with as much effectiveness and certainty as the one illustrated. Neither do we in this application make any claim to the device shown, as such forms the subject-matter of a separate application filed by us simultaneously with this application.

Figure 1:
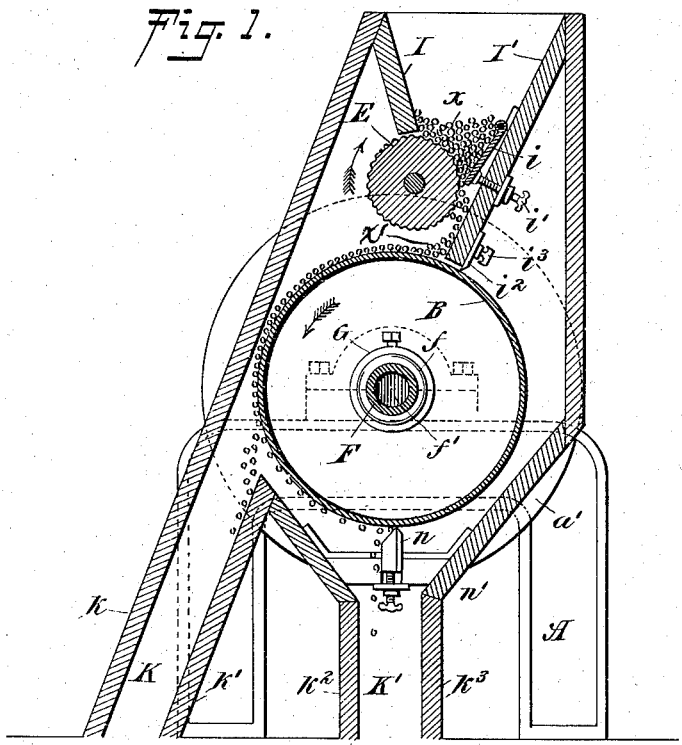
Figure 3:
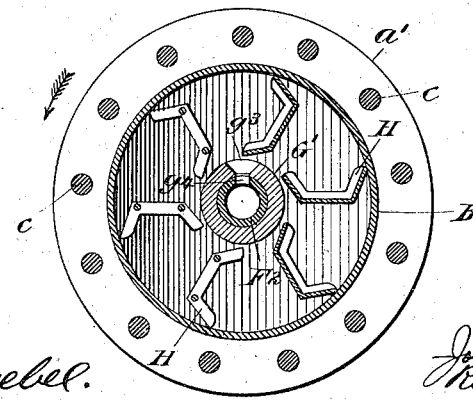

In the accompanying drawings, Figure 1 is a sectional view of a machine devised to carry out our improved method, the framework being omitted. Fig. 2 is a view thereof, partly in elevation and partly in section. Fig. 3 is a sectional view taken on the line 3 3 of Fig. 2.

To the upper side of any suitable framework are secured bearings $a$, in which is supported the revolving separating-cylinder B, preferably constructed of tubing of any suitable thickness and diameter and on the ends of which are threaded circular rings or flanges $a'$ $a'$, to which, in turn, are secured the cylinder-heads C C' by means of the stub-bolts $c$.

To the cylinder-heads C C' are secured the glands or stuffing-boxes $c'$ for the purpose of preventing the escape of steam with which said separating-cylinder is filled while in use, said glands or stuffing-boxes $c'$ fitting in the bearings $a$ and revolving therein with said separating-cylinder B.

To one of the glands $c'$ is rigidly secured the gear-wheel D, meshing with the smaller gear D', the latter being secured to one end of the shaft $d$, upon or to which is rigidly secured the feed-roll E, located above the separating-cylinder B.

For the purpose of imparting motion to the feed-roll and separating-cylinder we secure to the gland $c'$ the sprocket or pulley wheel E', which, when revolved, will by means of the gland $c'$ and gears D D' revolve the feed-roll E and separating-cylinder B in opposite directions, as indicated by the respective arrows thereon, Fig. 2.

Within the separating-cylinder B is located a stationary pipe F, secured at one end within the cylinder to the supply or inlet steam-pipe F' by means of the coupling $f$, communication between said pipes F and F', however, being cut off by the vertical partition $f'$, located within the coupling $f$. To the opposite end of the pipe F and within said cylinder B is secured the outlet-pipe $F^2$ by means of the coupling $f^5$, communication between said pipes $F^2$ and F being cut off by means of the vertical partition $f^2$, located within said coupling $f^5$, the said supply-pipe F' being provided with a valve $f^3$ at some convenient point in its length for regulating the supply of steam to said cylinder B, and the outlet-pipe $F^2$ being provided with a cock $f^4$ for the purpose of allowing the escape of steam therefrom during the heating of the cylinder B. To the outlet-pipe F² is secured a pipe F³, provided with a suitable valve $g$ and leading into a trap F⁴, into which, as will be hereinafter understood, is discharged the water of condensation from the interior of the cylinder B.

To prevent any lateral movement of the cylinder B upon the stationary inlet and outlet pipes F F², we secure to said pipes collars G G', fitting snugly against the inner sides of the cylinder-heads C C', said collar G being provided with a hole or passage-way $g'$, communicating with a similar opening $g^2$, formed in the inlet-pipe F', this arrangement allowing the steam to pass from the supply-pipe F' down through the passage-ways $g^2$ and $g'$ into the cylinder B for the purpose of heating the same. The collar G' is also provided with an opening or passage-way $g^3$, formed in the upper side thereof, communicating with a similar opening $g^4$, formed in said outlet-pipe F² for the purpose of allowing the escape of the water of condensation from the interior of the cylinder into said pipe, and, as before described, through said pipe F³ and into said trap F⁴.

For the purpose of discharging the condensed steam from the interior of the cylinder B into the outlet-pipe F² we bolt or otherwise rigidly secure to the inner face or side of the cylinder-head C' a number of bucket-shaped wings H of such shape and contour as to receive and carry up the water from the lower portion of the cylinder and discharge it into the outlet-pipe F² through the passage-ways $g^3$ and $g^4$ hereinbefore referred to, it being understood that said wings H are stationary with said cylinder-head C' and revolve therewith.

Above the feed-roll E is located a suitable hopper into which the material is fed, said hopper consisting of the two converging sides I I', the lower edge of the former coming into close proximity to the surface of the feed-roll E and the lower edge of the latter coming into close proximity with the separating-cylinder B, as shown in Fig. 1 of the drawings. This hopper is constructed of any suitable size, and in order to regulate the flow of material therefrom to the feed-roll E we provide a suitable gate therein, consisting of the gate proper, $i$, hinged or pivotally secured to the side I', the lower edge of said gate being thus adjustable in a direction either toward or away from the surface of the feed-roll E and held in any suitable adjustment by means of the thumb-screw $i'$.

To the lower edge of the rear side I' of the hopper is secured a scraping-plate $i^2$, the latter being adjustable upon said side in a direction either toward or away from the cylinder B by means of the thumb-screw $i^3$, this scraper being utilized for the purpose of preventing the escape of material down past the cylinder B on that respective side thereof.

Two passage-ways K K' are provided immediately below said separating-cylinder B, the passage-way K, as will hereinafter be seen, being utilized for the purpose of conveying the granular and starchy portions of the material from the machine and the latter passage-way K' being utilized for the purpose of carrying away the germs or oily portions of the grain. These passage-ways are formed by means of the partitions $k'$ $k^2$ $k^3$ and the front side $k$ of the machine, said passage-way K being preferably formed near the forward side or face of the machine and the passage-way K' immediately below the center of the cylinder B.

Below the cylinder B is located a scraping device consisting, preferably, of a scraping-plate $n$, vertically adjustable toward or away from the surface of said separating-cylinder and mounted upon a suitable support $n'$, extending across the upper portion of its respective passage-way.

Having now fully described one form or structure of machine devised for the purpose of carrying out our improved method, we will proceed to describe the method itself of treating the material.

The grain—such, for instance, as corn—is first cracked, crushed, or ground by any suitable means and in any desirable manner separated from the husks, hard and foreign material—as, for instance, by a series of screenings or winnowings—these several steps in the treatment of the grain being well known to those skilled in the art and hence need not be described in detail. The material after thus being ground and cleansed is then fed into the hopper of the machine, steam having been first admitted to the cylinder through the pipe F' and passage-ways $g'$ $g^2$, the cock $f^4$ being open. We do not confine ourselves to any precise degree of heat. With different cereals different degrees of heat will be found desirable. After the cylinder has become sufficiently heated the cock $f^4$ is closed and the feed-roll E and the separating-cylinder B are caused to revolve, as hereinbefore described. The material X in the hopper is fed onto the roll E and therefrom onto the separating-cylinder B, the feed thereof being regulated by the gate $i$, said hopper and feed-roll being set sufficiently far back past the center of the separating-cylinder to admit of considerable material accumulating on the top of the latter, as shown at $x'$, Fig. 1. The germs of the grain being soft adhere to the heated revolving cylinder B and are carried down thereon past the spout K or until they meet the scraping-plate $n$, whereupon they are scraped off and discharged down the spout K' and thence carried away from the machine, while the hard or starchy and glutinous portions of the ground material fall off the cylinder B immediately after riding over the outer edge thereof into the spout K, thus effecting a separation of the granular, starchy, and glutinous portions and the germs or oily portions of the grain.

Having fully described our invention, what we claim as new, and desire to secure by Letters Patent, is—

1. The method hereinbefore described of treating grain, consisting in first crushing, cracking or grinding the same, and then subjecting the material to a heated revolving roll or cylinder for separating the germs from the starchy and glutinous portions thereof.

2. The method hereinbefore described of treating grain, consisting in first crushing, cracking or grinding the same; secondly, screening, winnowing or otherwise separating the husks and rough portions therefrom, and finally subjecting the cleansed material to a heated revolving roll or cylinder for separating the germs or oily portions from the starchy and glutinous portions of the grain.

Signed at Indianapolis, in the county of Marion and State of Indiana, this 28th day of July, A. D. 1896.

JOSEPH FRANKLIN GENT.
RICHARD THOMAS GENT.

Witnesses:
FRANK H. SMITH,
HERBERT M. ADKINSON.